(12) United States Patent
Tanigawa et al.

(10) Patent No.: US 7,604,363 B2
(45) Date of Patent: Oct. 20, 2009

(54) LIGHT-EMITTING DEVICE

(75) Inventors: Seiji Tanigawa, Tsurugashima (JP);
Hideaki Takahashi, Nishitokyo (JP);
Michitaka Kamimura, Tsurugashima
(JP); Harumi Eguchi, Tsurugashima
(JP)

(73) Assignee: Toyo Denso Co., Ltd., Tokyo (JP)

( * ) Notice: Subject to any disclaimer, the term of this patent is extended or adjusted under 35 U.S.C. 154(b) by 132 days.

(21) Appl. No.: 12/000,620

(22) Filed: Dec. 14, 2007

(65) Prior Publication Data

US 2008/0151564 A1 Jun. 26, 2008

(30) Foreign Application Priority Data

Dec. 22, 2006 (JP) ............................. 2006-345463

(51) Int. Cl.
*F21V 9/16* (2006.01)
*H01J 1/62* (2006.01)

(52) U.S. Cl. ......................... 362/84; 362/487; 313/512; 313/483

(58) Field of Classification Search .................. 362/84, 362/501, 487; 313/483, 512
See application file for complete search history.

(56) References Cited

U.S. PATENT DOCUMENTS

| | | | | |
|---|---|---|---|---|
| 5,456,030 A | * | 10/1995 | Barone et al. | ................. 37/468 |
| 5,655,826 A | * | 8/1997 | Kouno et al. | .................. 362/24 |
| 6,746,067 B2 | * | 6/2004 | Schmidt et al. | .......... 296/37.13 |
| 7,014,908 B2 | * | 3/2006 | Yoneda et al. | .............. 428/192 |
| 7,082,721 B2 | * | 8/2006 | Whitehead | ................. 49/490.1 |
| 7,150,550 B2 | * | 12/2006 | Bogdan et al. | ............. 362/501 |
| 7,237,933 B2 | * | 7/2007 | Radu et al. | ................... 362/488 |
| 2004/0104673 A1 | * | 6/2004 | Hosokawa et al. | .......... 313/512 |

FOREIGN PATENT DOCUMENTS

JP 2003-092189 3/2003

* cited by examiner

*Primary Examiner*—Ali Alavi
(74) *Attorney, Agent, or Firm*—Steptoe & Johnson LLP

(57) ABSTRACT

A light-emitting device includes EL sheets assembled according to insert molding, a fixing body disposed on rear surfaces of the EL sheets and having a groove and holes for holding the EL sheets prior to being assembled according to insert molding in a desired position, and a molded body disposed on front surfaces of the EL sheets. The molded body is injection-molded in covering relation to the EL sheets held on the fixing body to integrally combine the fixing body and the EL sheet with the molded body according to insert molding.

11 Claims, 11 Drawing Sheets

LIGHT-EMITTING DEVICE

CLAIM OF PRIORITY

This application claims priority under 35 USC 119 to Japanese Patent Application No. 2006-345463, filed on Dec. 22, 2006, which is incorporated by reference in its entirety.

BACKGROUND OF THE INVENTION

1. Field of the Invention

The present invention relates to a light-emitting device including an EL sheet assembled according to insert molding.

2. Description of the Related Art

There have heretofore been proposed light-emitting devices which include an EL (ElectroLuminescence) sheet assembled according to insert molding, for emitting light from interior parts of automobiles and exterior parts of mobile phones and home electric appliances.

One such light-emitting device, disclosed in Japanese Laid-Open Patent Publication No. 2003-092189, includes a bent EL sheet having a back electrode layer and a resin-molded component integrally formed with at least the outer surface of the back electrode layer, i.e., the outer surface from which no light will be emitted. The disclosed light-emitting device is produced as follows: An EL sheet with an adhesive layer formed thereon is plastically deformed, i.e., permanently bent, to a shape including a curved portion in advance. The plastically deformed EL sheet is put into an injection mold and placed on a surface thereof which defines a mold cavity. Then, a resin is injected into the mold cavity. The adhesive of the adhesive layer is melted with the heat of the injected resin to bond the EL sheet to the resin. In this manner, the EL sheet is assembled in the light-emitting device by insert molding.

The EL sheet is very thin, e.g., has a thickness of about 0.3 mm, and hence is weak against external shocks and abrupt bending forces. When the EL sheet is plastically deformed as disclosed in Japanese Laid-Open Patent Publication No. 2003-092189, the electrode layer may possibly be damaged at a plastically deformed bent corner, tending to cause a nonluminescent portion due to a short circuit.

Furthermore, the light-emitting device disclosed in Japanese Laid-Open Patent Publication No. 2003-092189 has the EL sheet exposed on its outer surface. If the light-emitting device is installed in a switch on a motorcycle, for example, then when the light-emitting device is wetted with rainwater, light-emitting elements in the EL sheet are likely to deteriorate due to absorbed water and to lower the luminance of light emitted thereby.

SUMMARY OF THE INVENTION

It is a general object of the present invention to provide a light-emitting device which includes an EL sheet that is assembled according to insert molding without being damaged even in a bent portion of the light-emitting device.

A major object of the present invention is to provide a light-emitting device which includes an EL sheet with increased water resistance.

According to an aspect of the present invention, a light-emitting device comprises an EL sheet assembled according to insert molding, a fixing body disposed on one surface of the EL sheet and having a holder for holding the EL sheet prior to being assembled according to insert molding in a given position, and a molded body disposed on another surface of the EL sheet, the molded body being injection-molded in covering relation to the EL sheet held on the fixing body to integrally combine the fixing body and the EL sheet with the molded body according to insert molding.

With the above arrangement, since the EL sheet held on the fixing body is assembled in the molded body together with the fixing body according to insert molding, the EL sheet is less weak against damage, and is shielded from the external environment. Water is prevented from entering into the EL sheet, so that light-emitting elements of the EL sheet are effectively prevented from deteriorating. Since the EL sheet is not exposed to the outside, the light-emitting device has a better appearance.

The EL sheet may be held in a curved shape by the holder.

The EL sheet may have a feeder terminal and may be assembled according to insert molding with only the feeder terminal being exposed from the fixing body or the molded body. Even though the EL sheet is combined with the molded body according to insert molding, the EL sheet may easily be connected to an external control board or the like through the exposed feeder terminal while being kept water-resistant.

In such a case, the fixing body may have at least two of the holders, and the EL sheet may be held by the two holders. One of the holders may comprise a groove for inserting therein an end of the EL sheet and the other of the holders may comprise a hole for inserting therein the terminal. The terminal thus inserted in the hole can easily be exposed to the outside, and the EL sheet can be held.

The EL sheet may be assembled according to insert molding while being elastically deformed (deformed such that the EL sheet restores its original shape when unloaded) and held by the holder. The EL sheet thus elastically deformed may be assembled according to insert molding without being damaged.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Preferred embodiments of the present invention will be described in detail below with reference to the accompanying drawings.

Figure 1:
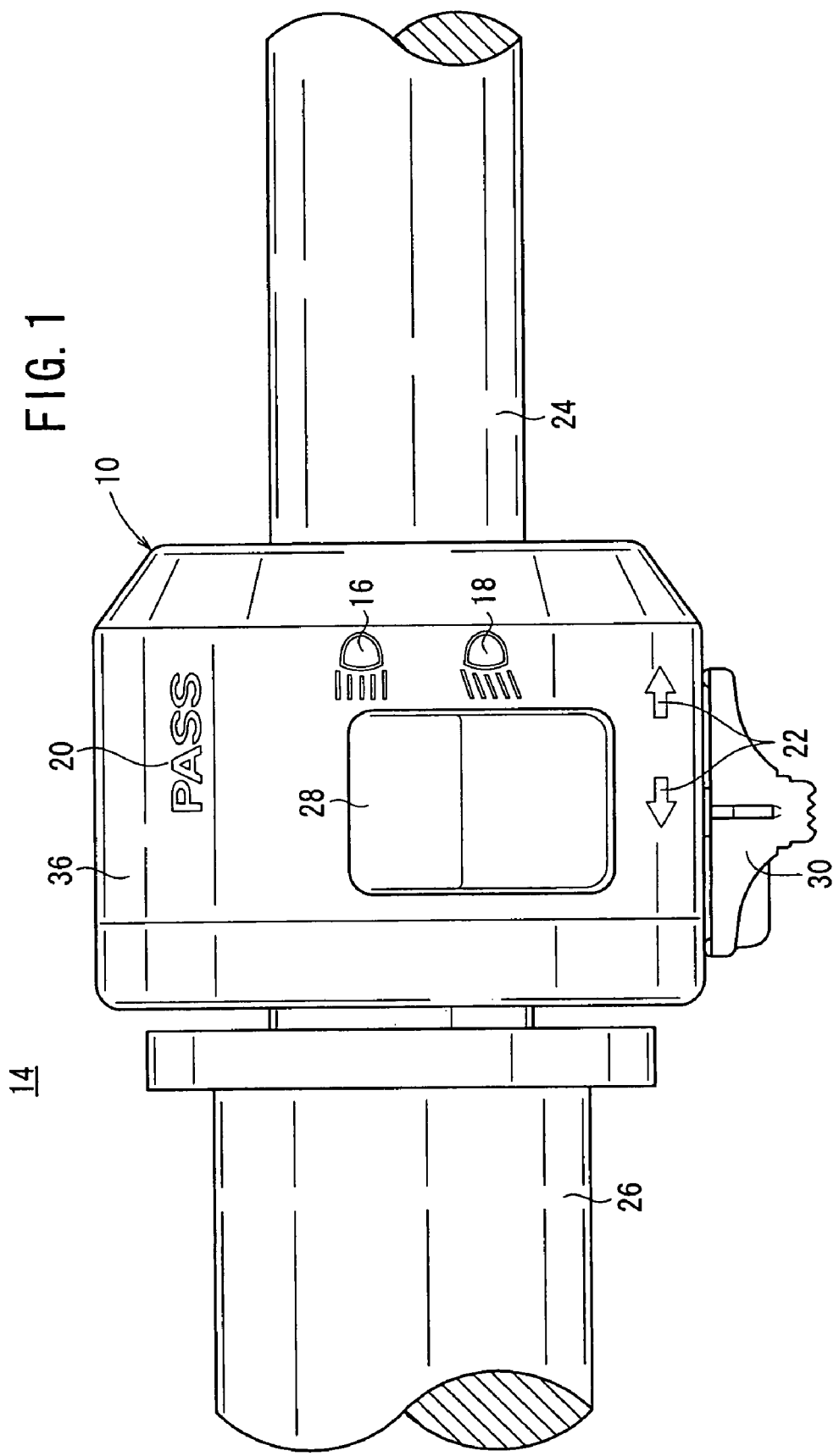
FIG. 1 is a front elevational view of a handle switch of a motorcycle which incorporates a light-emitting device according to an embodiment of the present invention and nearby components of the motorcycle.

FIG. 1 shows in front elevation a handle switch 14 of a motorcycle which incorporates a light-emitting device 10 according to an embodiment of the present invention and nearby components of the motorcycle. As shown in FIG. 1, the light-emitting device 10 includes EL sheets 12a, 12b (see FIG. 2), assembled according to insert molding, for turning on a high-beam indicator 16, a low-beam indicator 18, a passing indicator 20, and a turn signal indicator 22. According to the present embodiment, the light-emitting device 10 will be described as being incorporated in the handle switch 14 of the motorcycle. However, the light-emitting device is also applicable to various illuminating components having display areas for being turned on from inside, including interior and exterior parts of automobiles, e.g., power window switches, combination switches, garnishes, etc. of automobiles, and exterior parts of mobile phones and home electric appliances.

As shown in FIG. 1, the handle switch 14 is disposed between a handle pipe 24 and a grip 26 of a handle of the motorcycle, so that the handle switch 14 can easily be operated by the thumb of a hand of the rider while the hand is gripping the grip 26. The handle switch 14 is of a substantially semicylindrical shape (see FIG. 2) including a curved outer surface on which there are mounted a beam switch 28 for switching between a high beam and a low beam, a turn signal switch 30 for switching between turn signals, and a passing switch, not shown. At night or while headlights are turned on, the light-emitting device 10 energizes the various indicators for the rider to visually recognize the states and positions of the switches 28, 30 reliably.

Figure 2:
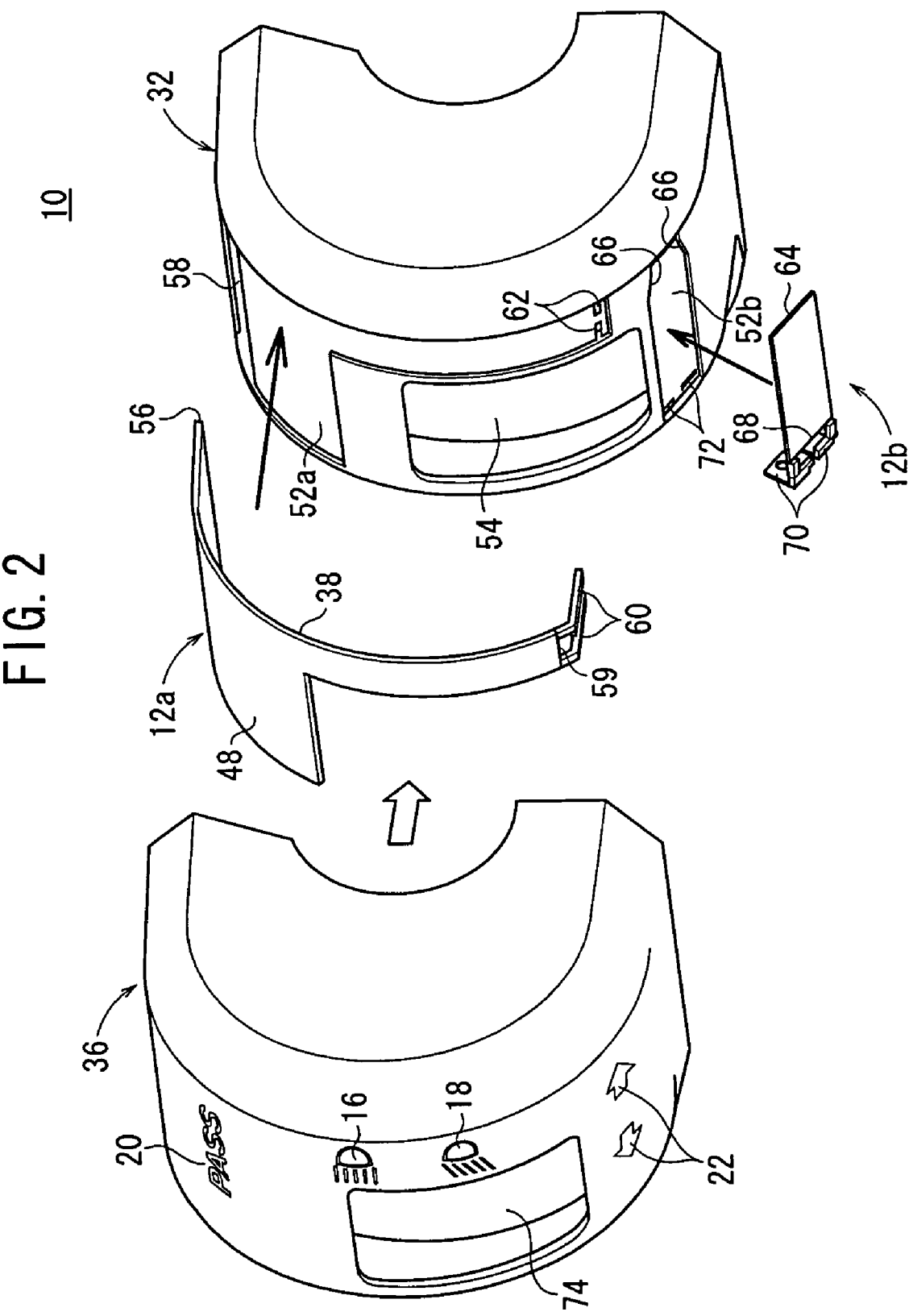
FIG. 2 is an exploded perspective view of the light-emitting device incorporated in the handle switch shown in FIG. 1.

FIG. 2 shows in exploded perspective the light-emitting device 10 incorporated in the handle switch 14 shown in FIG. 1.

As shown in FIG. 2, the light-emitting device 10 comprises a fixing body (first molded body) 32, EL sheets 12a, 12b held on an outer surface of the fixing body 32, and a molded body (second molded body) 36 injection-molded on the outer surface (front surface) of the fixing body 32 in covering relation to the EL sheets 12a, 12b. The EL sheets 12a, 12b and the fixing body 32 are assembled in the molded body 36 by insert molding.

Figure 3:
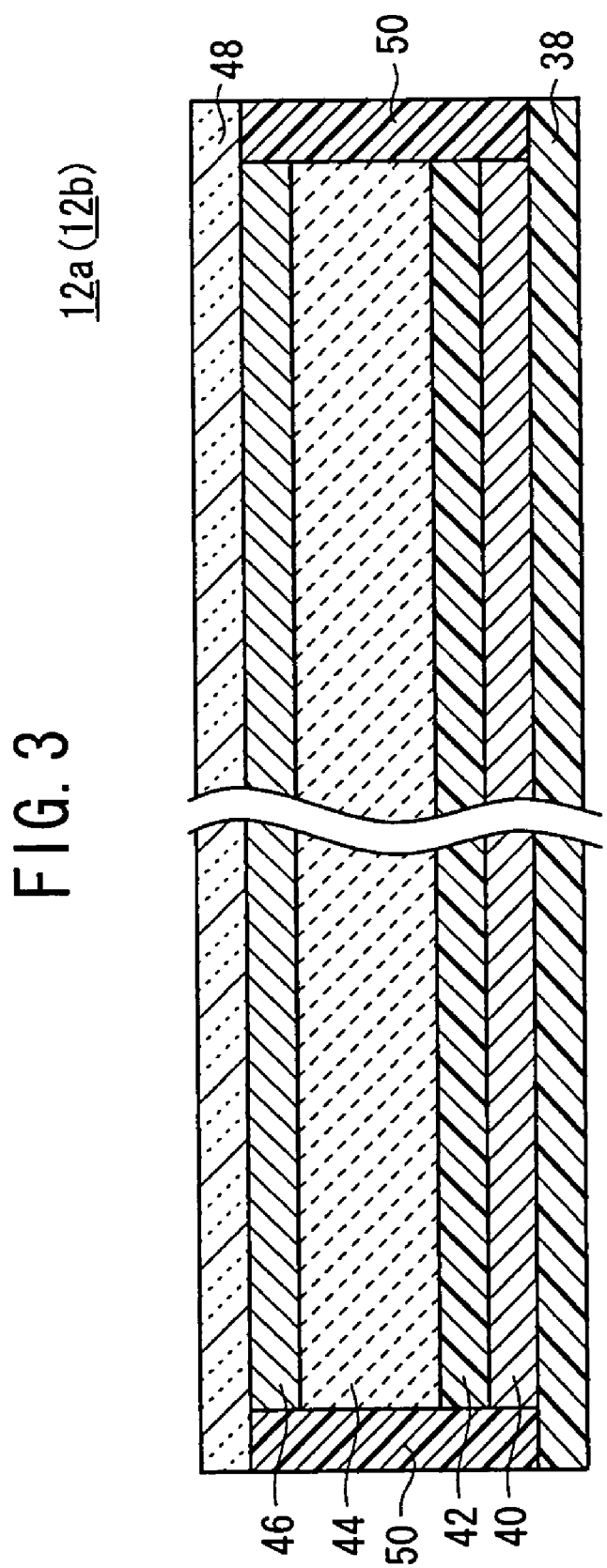
FIG. 3 is a fragmentary vertical cross-sectional view schematically showing the structure of an EL sheet of the light-emitting device.

Structural details of the EL sheets 12a, 12b will be described below with reference to FIG. 3. FIG. 3 shows the structure of the EL sheet 12a in fragmentary vertical cross section. The EL sheets 12a, 12b are essentially identical in structure to each other except that they have different outer shapes corresponding to portions on which they are mounted. Therefore, only the EL sheet 12a will be described below, and the EL sheet 12b will not be described in detail below. However, the EL sheets 12a, 12b may have different structural details.

As shown in FIG. 3, the EL sheet 12a comprises a rear protective plate 38 as a rearmost (lowermost in FIG. 3) layer from which no light will be emitted, and a plurality of layers successively stacked on the rear protective plate 38. The EL sheet 12a has an overall thickness of about 0.3 mm. The rear protective plate 38 comprises a film of aluminum, polyethylene terephthalate (PET) or the like.

The layers stacked on the rear protective plate 38 will be described below.

A rear electrode 40 is disposed on the rear protective plate 38. The rear electrode 40 is made of aluminum, copper alloy, carbon, or the like, for example.

An insulating layer 42 is disposed on the rear electrode 40. The insulating layer 42 is formed by printing an insulating coating agent on the rear electrode 40 according to screen printing or the like.

A light-emitting layer 44 is disposed on the insulating layer 42. The light-emitting layer 44 is formed on the insulating layer 42 by printing a light-emitting ink containing illuminants of zinc sulfide (ZnS) doped with copper (Cu), for example.

A transparent electrode 46 is disposed on the light-emitting layer 44. The transparent electrode 46 is formed by evaporating indium-tin oxide (ITO) or printing a dispersion of acicular crystal of ITO distributed in a binder resin, for example.

A surface substrate 48 is disposed on the transparent electrode 46. The surface substrate 48 comprises a glass substrate or a PET resin film, for example.

The layers of the EL sheet 12a except the rear protective plate 38 and the surface substrate 48, i.e., the rear electrode 40, the insulating layer 42, the light-emitting layer 44, and the transparent electrode 46, have their outer edges sealed by a sealant layer 50 and hence are constructed as a single sheet assembly. The sealant layer 50 is joined to the outer edges of the layers by adhesive bonding or thermal fusion. Light emitted from the light-emitting layer 44 passes through the transparent electrode 46 and the surface substrate 48, which serves as a side for emitting light (upper side in FIG. 3). The layers put together by the sealant layer 50 function as a light emitter of the light-emitting device 10.

As shown in FIG. 2, the fixing body 32 serves as an inner component of the light-emitting device 10, and functions to hold the EL sheets 12a, 12b in position when the molded body 36 is injection-molded. The fixing body 32 is of a substantially semicylindrical hollow shape, and has positioning recesses 52a, 52b defined in a curved outer surface thereof for placing the EL sheets 12a, 12b respectively therein, and a switch hole 54 defined in the curved outer surface thereof for placing the beam switch 28 therein. The positioning recesses 52a, 52b are substantially identical in shape to the EL sheets 12a, 12b, respectively. A control board, not shown, on which the beam switch 28 and the turn signal switch 30 are mounted is disposed in the inner space of the fixing body 32.

The positioning recess 52a includes a groove 58 in a wider upper end portion thereof for inserting therein a wider upper end 56 of the EL sheet 12a. The positioning recess 52a also includes a pair of holes 62 in a narrower lower end portion thereof for inserting therethrough respective feeder terminals 60 of metal mounted on a narrower lower end 59 of the EL sheet 12a.

The positioning recess 52b includes a pair of grooves 66 in respective corners of an end thereof (right end in FIG. 2) for inserting therein respective corners of an end 64 of the EL sheet 12b. The positioning recess 52b also includes a pair of holes 72 in the other end portion thereof for inserting therethrough respective feeder terminals 70 of metal mounted on the other end 68 of the EL sheet 12b.

The molded body 36 is of an outer profile which is essentially identical to the fixing body 32 except that the molded body 36 is free of the positioning recesses 52a, 52b, and is slightly greater in size than the fixing body 32 because the fixing body 32 is housed in the molded body 36.

The molded body 36 has a switch hole 74 defined in a curved wall thereof for placing therein the beam switch 28 which is inserted in the switch hole 54 of the fixing body 32. The molded body 36 also has on the outer surface of the curved wall thereof the high-beam indicator 16, the low-beam indicator 18, the passing indicator 20, and the turn signal indicator 22.

When the molded body 36 is injection-molded around the fixing body 32 with the EL sheets 12a, 12b held thereon, the EL sheets 12a, 12b and the fixing body 32 are integrally combined with the molded body 36 according to insert molding. At this time, the high-beam indicator 16, the low-beam indicator 18, and the passing indicator 20 are placed over the EL sheet 12a, and the turn signal indicator 22 is placed over the EL sheet 12b (see FIGS. 6 and 7).

The fixing body 32 and the molded body 36 are made of nylon 6 with glass fibers added, for example. The outer surface of the molded body 36 is coated with a desired paint by a spraying process or the like, and the paint layer on the indicators is removed. Therefore, when the EL sheets 12a, 12b are energized, the indicators pass light emitted from the EL sheets 12a, 12b.

Figure 4:
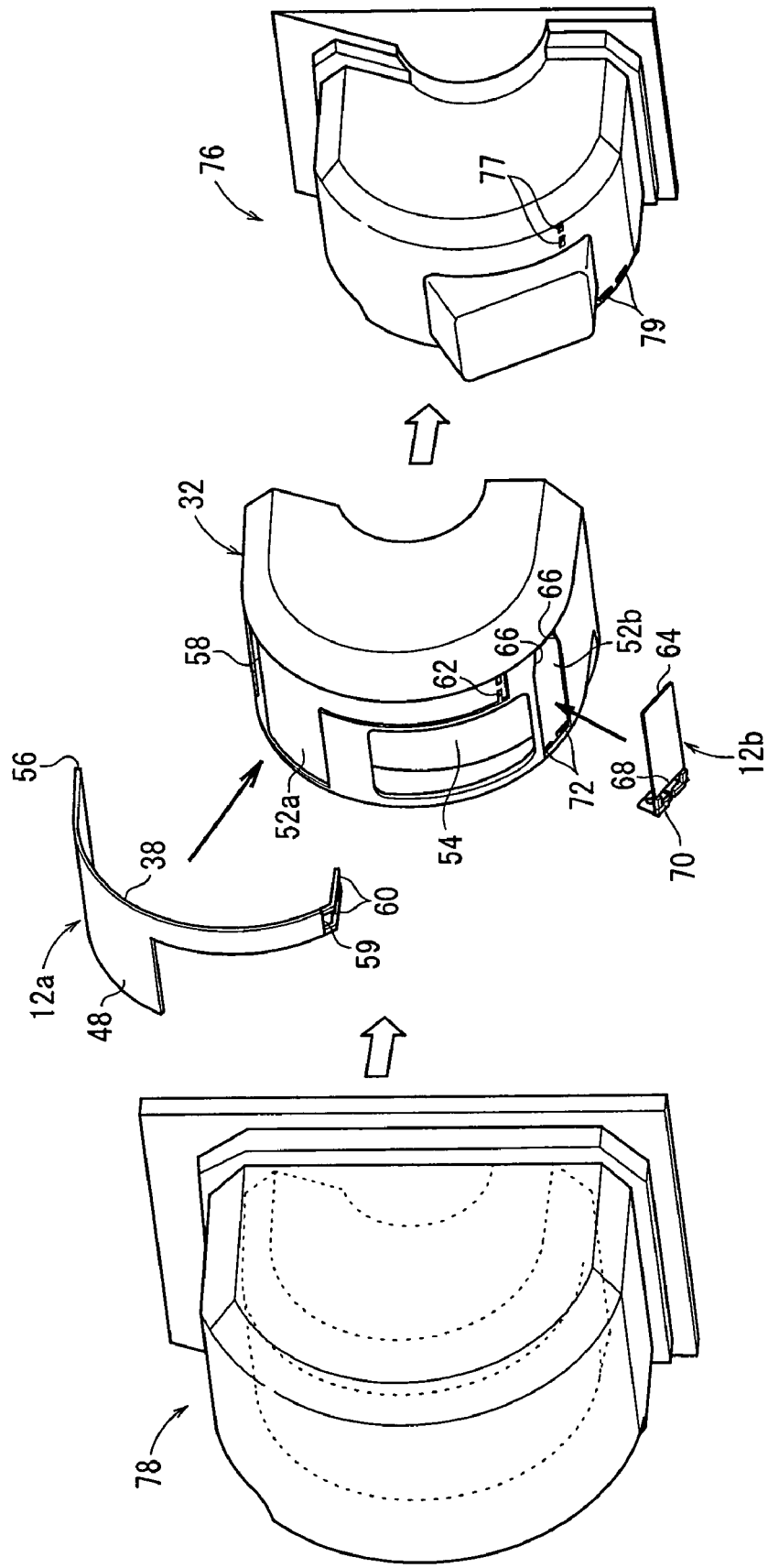
FIG. 4 is an exploded perspective view schematically showing the manner in which a fixing body of the light-emitting device shown in FIG. 2 is formed.
Figure 5:
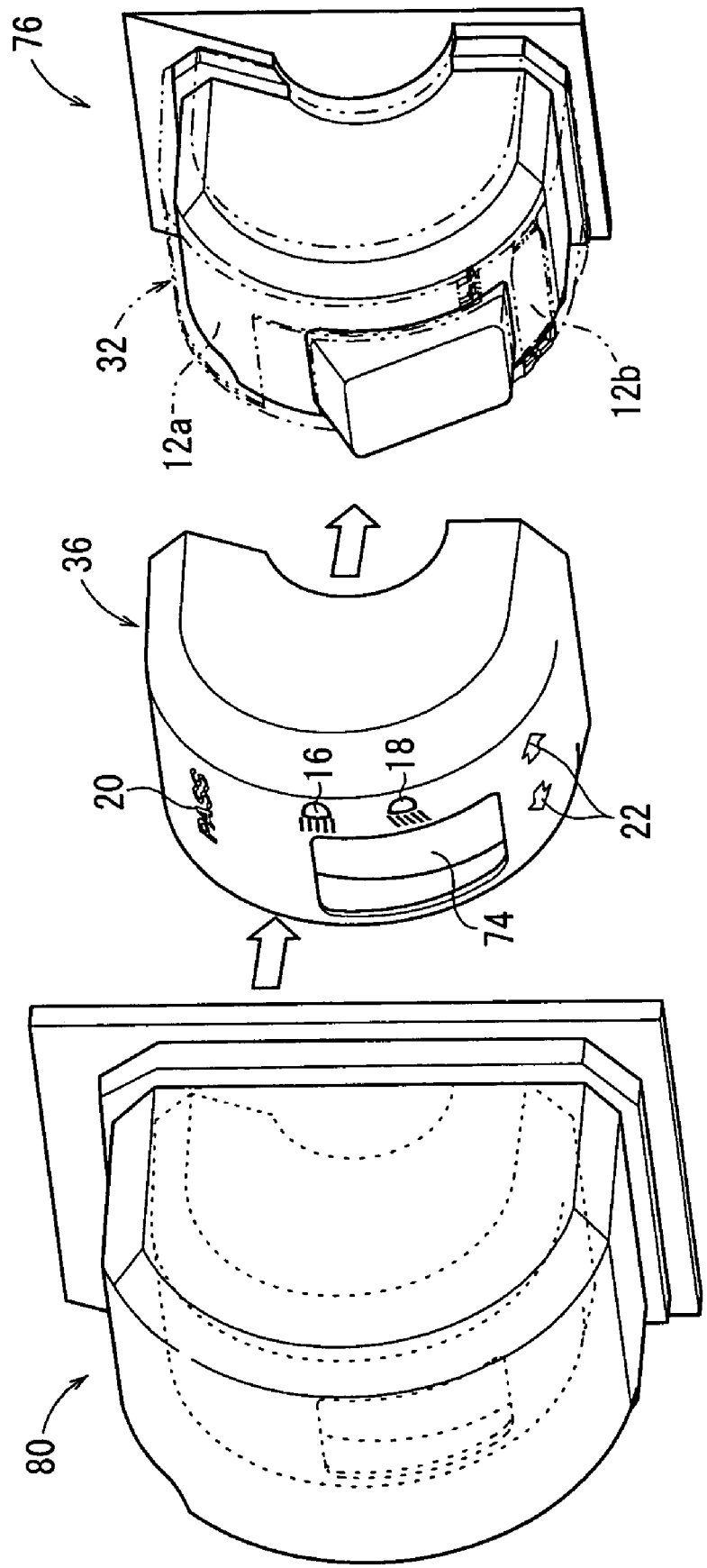
FIG. 5 is an exploded perspective view schematically showing the manner in which a molded body is formed around the fixing body shown in FIG. 4.

A process of manufacturing the light-emitting device 10 which is basically constructed as described above will be described with reference to FIGS. 4 and 5. FIG. 4 is an exploded perspective view schematically showing the manner in which the fixing body 32 of the light-emitting device 10 shown in FIG. 2 is formed, and FIG. 5 is an exploded perspective view schematically showing the manner in which the molded body 36 is formed around the fixing body 32 shown in FIG. 4.

First, the fixing body 32 is injection-molded as a first molded body. Specifically, as shown in FIG. 4, a the fixing body 32 is molded by injecting a resin, e.g., nylon 6, into a mold cavity that is defined by a fixed mold 76 for molding a rear side (inner side) of the fixing body 32 and a first movable mold 78 for molding a front side (outer side) of the fixing body 32. Thereafter, the first movable mold 78 is moved away from the fixed mold 76 which remains fixed in position.

Then, the EL sheets 12a, 12b are positioned and secured in the respective positioning recesses 52a, 52b of the fixing body 32 thus molded. At this time, the surface substrates 48, from which light will be emitted, of the EL sheets 12a, 12b face outwardly of the fixing body 32.

The positioning recess 52a in which the EL sheet 12a is secured is curved, i.e., has a curved bottom wall surface. Therefore, while the EL sheet 12a is being bent, i.e., elastically deformed, the end 56 of the EL sheet 12a is inserted into the groove 58. At the same time, the terminals 60 are inserted into the holes 62, respectively, and also into terminal holding holes 77 defined in the fixed mold 76. The EL sheet 12a is thus fitted in the positioning recess 52a and reliably held along the curved bottom wall surface of the positioning recess 52a. Similarly, the EL sheet 12b is fitted in the positioning recess 52b with the corners of the end 64 and the terminals 70 being inserted in the grooves 66, the holes 72, and terminal holding holes 79 defined in the fixed mold 76. The grooves 58, 66 and the holes 62, 72, and the positioning recesses 52a, 52b and the terminal holding holes 77, 79 thus function as a holder for holding the EL sheets 12a, 12b.

Then, the molded body 36 is injection-molded as a second molded body. Specifically, as shown in FIG. 5, a second movable mold 80 for forming a front side (outer side) of the molded body 36 is placed in front of the fixing body 32 which is supported by the fixed mold 76 and which is holding the EL sheets 12a, 12b. Then, a resin, e.g., nylon 6, is injected into a mold cavity defined between the fixing body 32 and the second movable mold 80, thereby molding the molded body 36. Thereafter, the second movable mold 80 is moved away from the fixed mold 76, and the molded product, i.e., the light-emitting device 10, is removed from the fixed mold 76.

Figure 6:
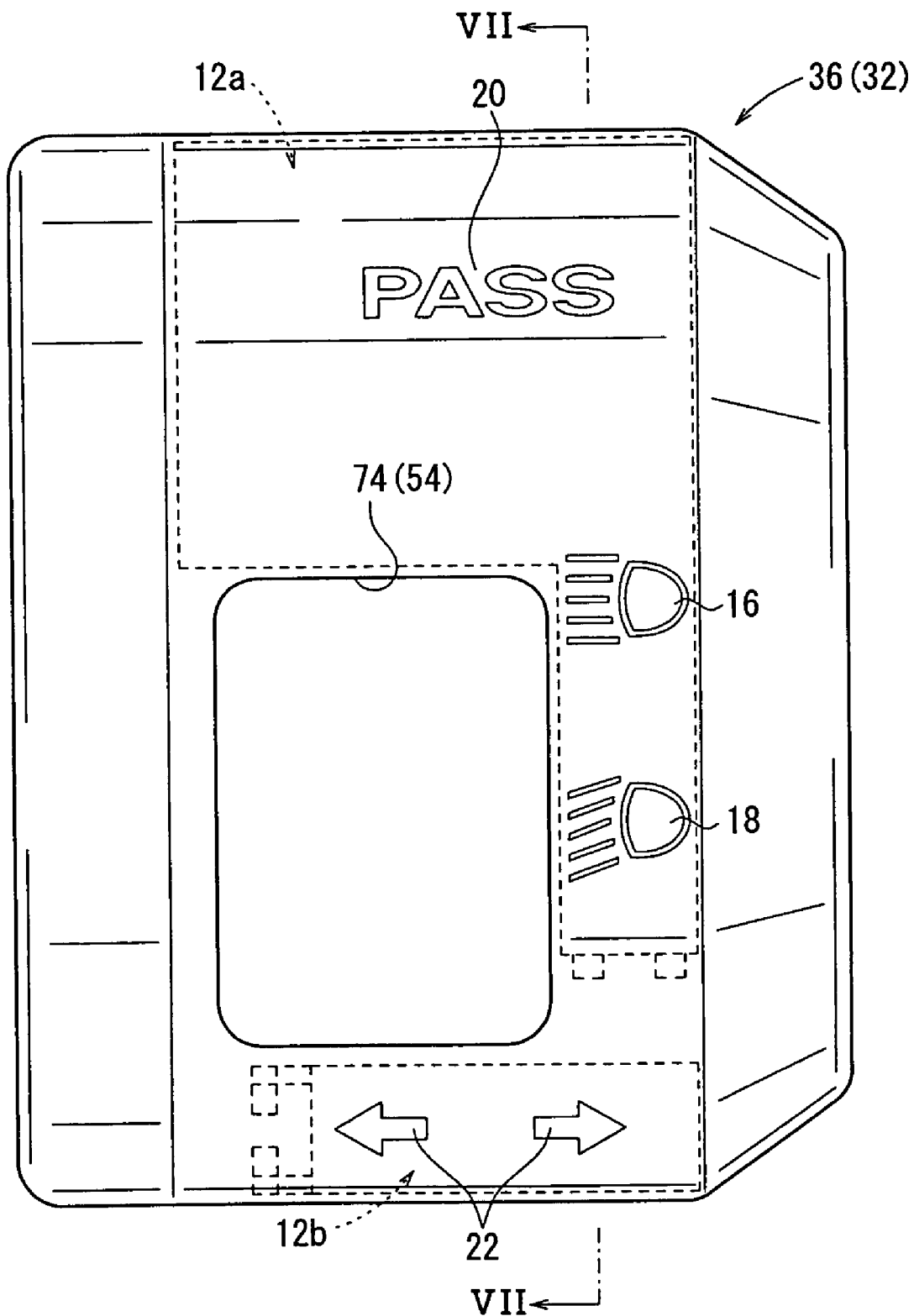
FIG. 6 is a schematic front elevational view of the light-emitting device shown in FIG. 2.
Figure 7:
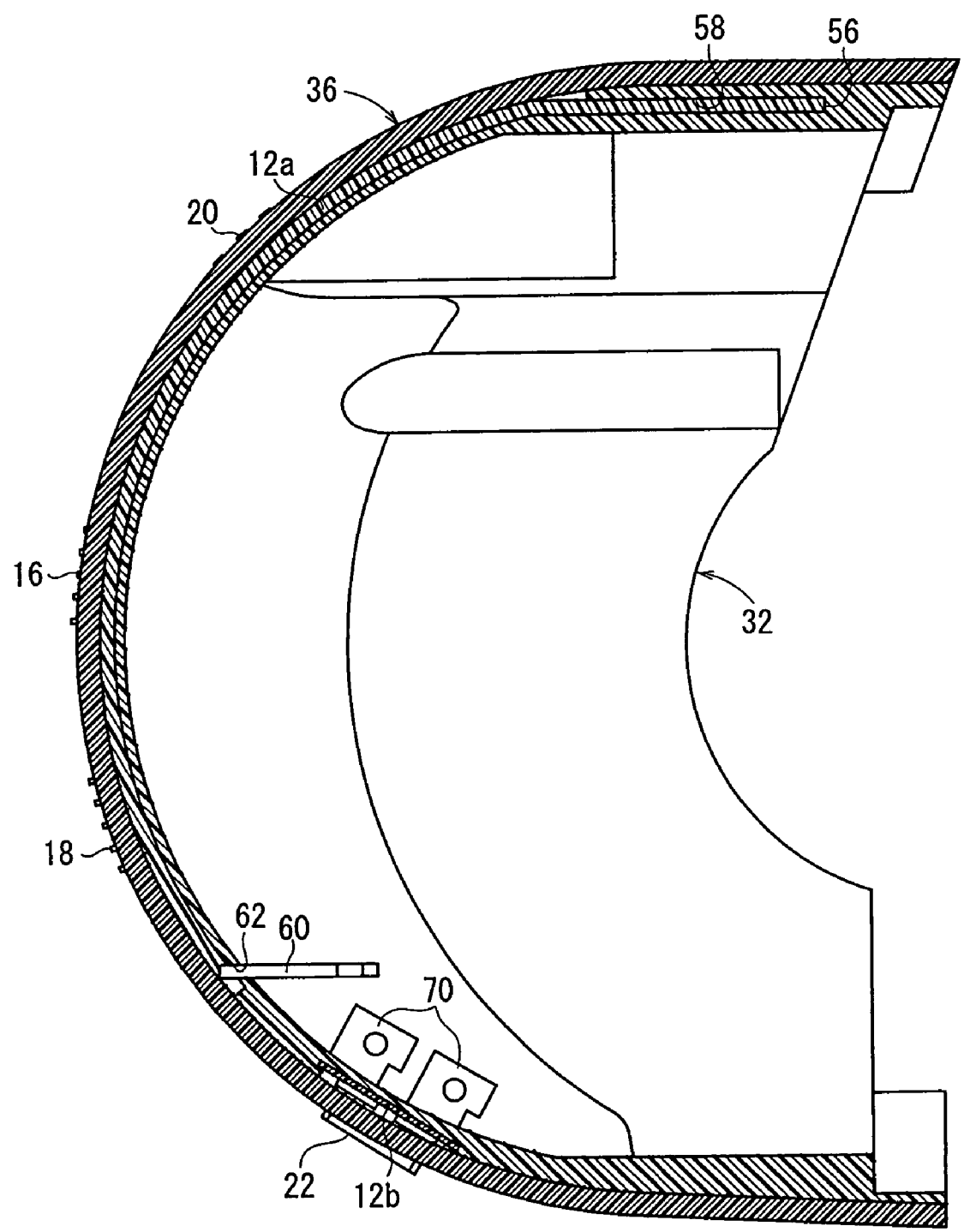
FIG. 7 is a cross-sectional view taken along line VII-VII of FIG. 6.

In this manner, the light-emitting device 10 wherein the molded body 36 is disposed on the fixing body 32 with the EL sheets 12a, 12b sandwiched (encased) therebetween, i.e., with the EL sheets 12a, 12b assembled according to insert molding, is produced, as shown in FIGS. 6 and 7.

At the time the fixing body 32 shown in FIG. 4 is molded, the grooves 58, 66 can easily be formed by a groove former, not shown, on the first movable mold 78 or the fixed mold 76 when the first movable mold 78 is slid with respect to the fixed mold 76. At this time, parting lines, i.e., lines where the molds are separated from each other, may be produced at apposition behind the EL sheets 12a, 12b, i.e., on the bottom surfaces of the positioning recesses 52a, 52b, and may possibly adversely affect the emission of light from the EL sheets 12a, 12b. Therefore, it is preferable to position the positioning recesses 52a, 52b and the grooves 58, 66 for forming the parting lines at positions not overlapping the high beam indicator 16 and other indicators that are turned on by the EL sheets 12a, 12b.

Gates of the molds for injecting the resin into the mold cavities should preferably be located at positions other than the light-emitting surfaces of the EL sheets 12a, 12b in order to prevent the light-emitting surfaces from being damaged by high temperatures and high pressures in the vicinity of the gates.

When the molded body 36 is injection-molded as the second molded body, the EL sheets 12a, 12b are pressed against the bottom surfaces of the positioning recesses 52a, 52b under the pressure of the injected resin. The EL sheets 12a, 12b are held so as to be slightly movable at the grooves 58, 66 and the holes 62, 72. Therefore, since the EL sheets 12a, 12b that are pressed against the bottom wall surfaces of the positioning recesses 52a, 52b are encased in the resin during the insert molding process while being kept taut smoothly along the bottom surfaces of the positioning recesses 52a, 52b, the EL sheets 12a, 12b are effectively prevented from being damaged in the insert molding process. This molding process is particularly applicable to a structure wherein the surfaces for placing the EL sheets thereon are curved, as with the light-emitting device 10.

With the light-emitting device 10 according to the present embodiment, as described above, since the EL sheets 12a, 12b are assembled together with the fixing body 32 in the molded body 36 according to insert molding, the EL sheets 12a, 12b are shielded from the external environment. Consequently, water is prevented from entering into the EL sheets 12a, 12b, and the light-emitting layer 44 and other layers are effectively prevented from deteriorating. Since the EL sheets 12a, 12b are not exposed to the outside, the light-emitting device 10 has a better appearance, giving the handle switch 14 a better appearance. For reliably sealing (inserting) the EL sheets 12a, 12b, the fixing body 32 should preferably be of an outer profile which is essentially the same as the molded body 36.

The feeder terminals 60, 70 for supplying electric currents to the EL sheets 12a, 12b are exposed from the inner surface of the fixing body 32 through the holes 62, 72 defined in the fixing body 32. Consequently, though the EL sheets 12a, 12b are insert-molded, the EL sheets 12a, 12b are easily electrically connected to the control board or the like disposed in the inner space of the fixing body 32, so that the EL sheets 12a, 12*b* can be supplied with electric currents from the control board. The terminals 60, 70 may be exposed from the molded body 36.

According to the related art described above, the EL sheet is loaded or stressed twice, i.e., when it is bent and when it is insert-molded. According to the present embodiment, however, the EL sheets 12*a*, 12*b* are elastically deformed, and then insert-molded while being held on the fixing body 32. When the EL sheets 12*a*, 12*b* are elastically deformed, i.e., curved in an elastically deformable range, they are not unduly loaded to the extent that they may be damaged because they are not plastically deformed. The EL sheets 12*a*, 12*b* are loaded only when they are insert molded. Consequently, the EL sheets 12*a*, 12*b* are much less likely to be damaged than with the related art.

In the above embodiment, the EL sheets 12*a*, 12*b* are held in place by their ends, corners, and terminals inserted in the grooves 58, 66 and the holes 62, 72 defined in the fixing body 32. However, the EL sheets 12*a*, 12*b* may be attached to the bottom wall surfaces of the positioning recesses 52*a*, 52*b* by an adhesive, a double-sided adhesive tape, or the like. If the EL sheets 12*a*, 12*b* are thus attached to the bottom wall surfaces of the positioning recesses 52*a*, 52*b*, however, it is necessary to see to it that the EL sheets 12*a*, 12*b* are free of steps, flexures, etc. If the EL sheets 12*a*, 12*b* has steps, flexures, etc., then since the EL sheets 12*a*, 12*b* are secured and are not allowed to move, the EL sheets 12*a*, 12*b* may possibly be damaged under the pressure of the resin that is injected to form the molded body 36.

In the above embodiment, after the fixing body 32 is molded using the fixed mold 76 and the first movable mold 78, the EL sheets 12*a*, 12*b* are assembled in the molded body 36 according to insert molding. However, the fixing body 32 may not necessarily be molded immediately before the molded body 36 is molded. Specifically, the fixing body 32 may be a molded body which was prepared separately in advance. Further alternatively, the fixing body 32 may be made of metal, etc. though it should be of an outer profile which is essentially identical to the molded body 36.

The bottom wall surfaces of the positioning recesses 52*a*, 52*b* for holding the EL sheets 12*a*, 12*b* thereon may not be curved surfaces, but may be flat surfaces, for example.

The EL sheets 12*a*, 12*b* may be held on the fixed mold 76, for example, rather than being held on the fixing body 32, or may be held on both the fixing body 32 and the fixed mold 76.

As described above, the principles of the present invention are also applicable to light-emitting devices other than the light-emitting device 10 according to the above embodiment which is incorporated in the handle switch 14 of the motorcycle.

Figure 8:
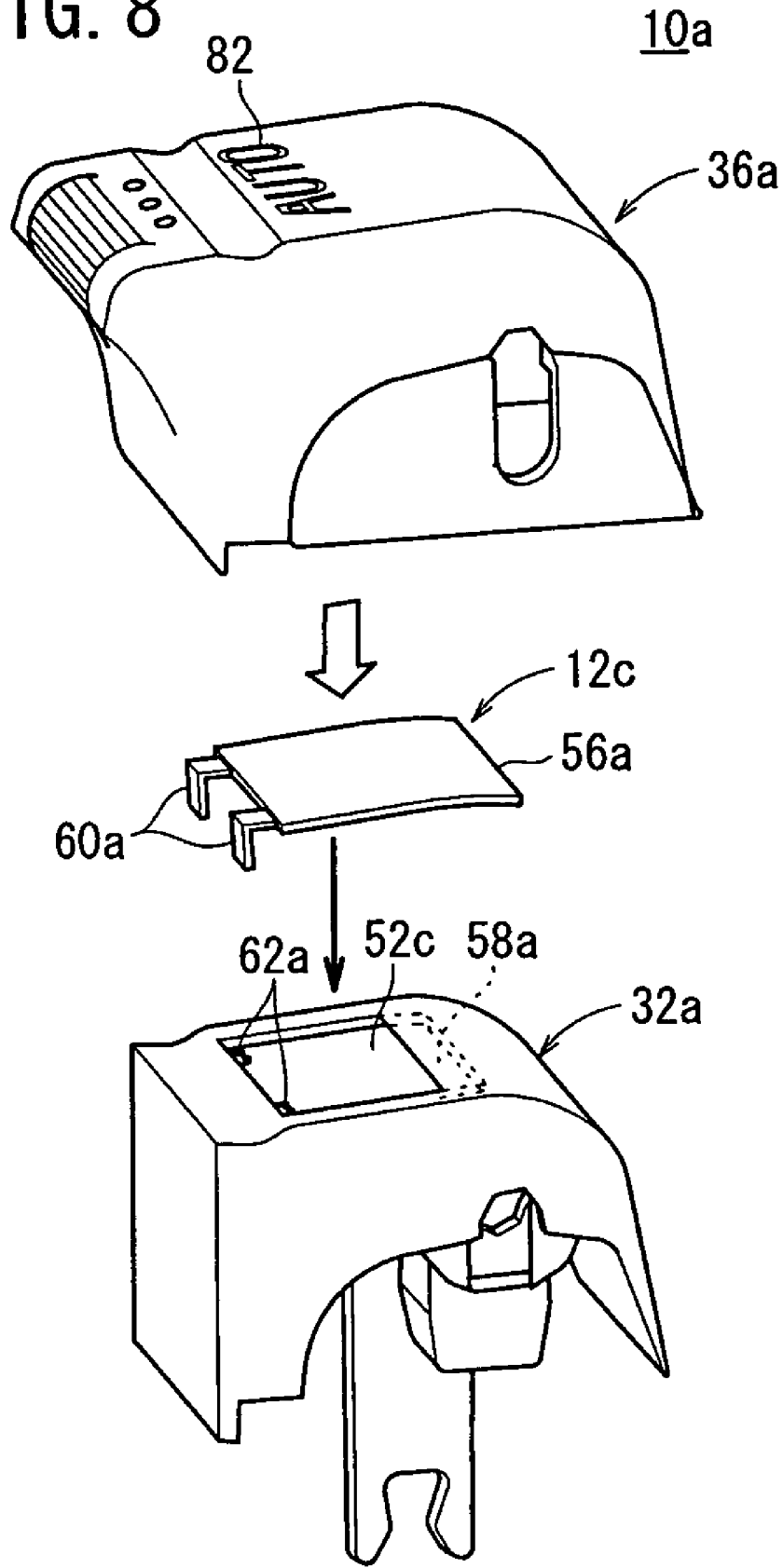
FIG. 8 is an exploded perspective view of a light-emitting device according to the present invention as applied to a power window switch of an automobile.

FIG. 8 is an exploded perspective view of a light-emitting device 10*a* according to the present invention as applied to a power window switch of an automobile. The light-emitting device 10*a* comprises a fixing body (first molded body) 32*a*, an EL sheet 12*c* held on an outer surface of the fixing body 32*a*, and a molded body (second molded body) 36*a* injection-molded on the outer surface (front surface) of the fixing body 32*a* in covering relation to the EL sheet 12*c*.

The outer surface of the fixing body 32*a* has a positioning recess 52*c* defined therein for placing the EL sheet 12*c* therein. The positioning recess 52*c* includes a groove 58*a* in an end thereof for inserting therein an end 56*a* of the EL sheet 12*c*. The positioning recess 52*c* includes a pair of holes 62*a* in the other end thereof for inserting therethrough respective terminals 60*a* of the EL sheet 12*c*. When the molded body 36*a* is injection-molded around the fixing body 32*a* with the EL sheet 12*c* held thereon, the EL sheet 12*c* and the fixing body 32*a* are assembled in the molded body 36*a* according to insert molding. The molded body 36*a* has a power window switch indicator (AUTO) 82 placed over the EL sheet 12*c*.

Figure 9:
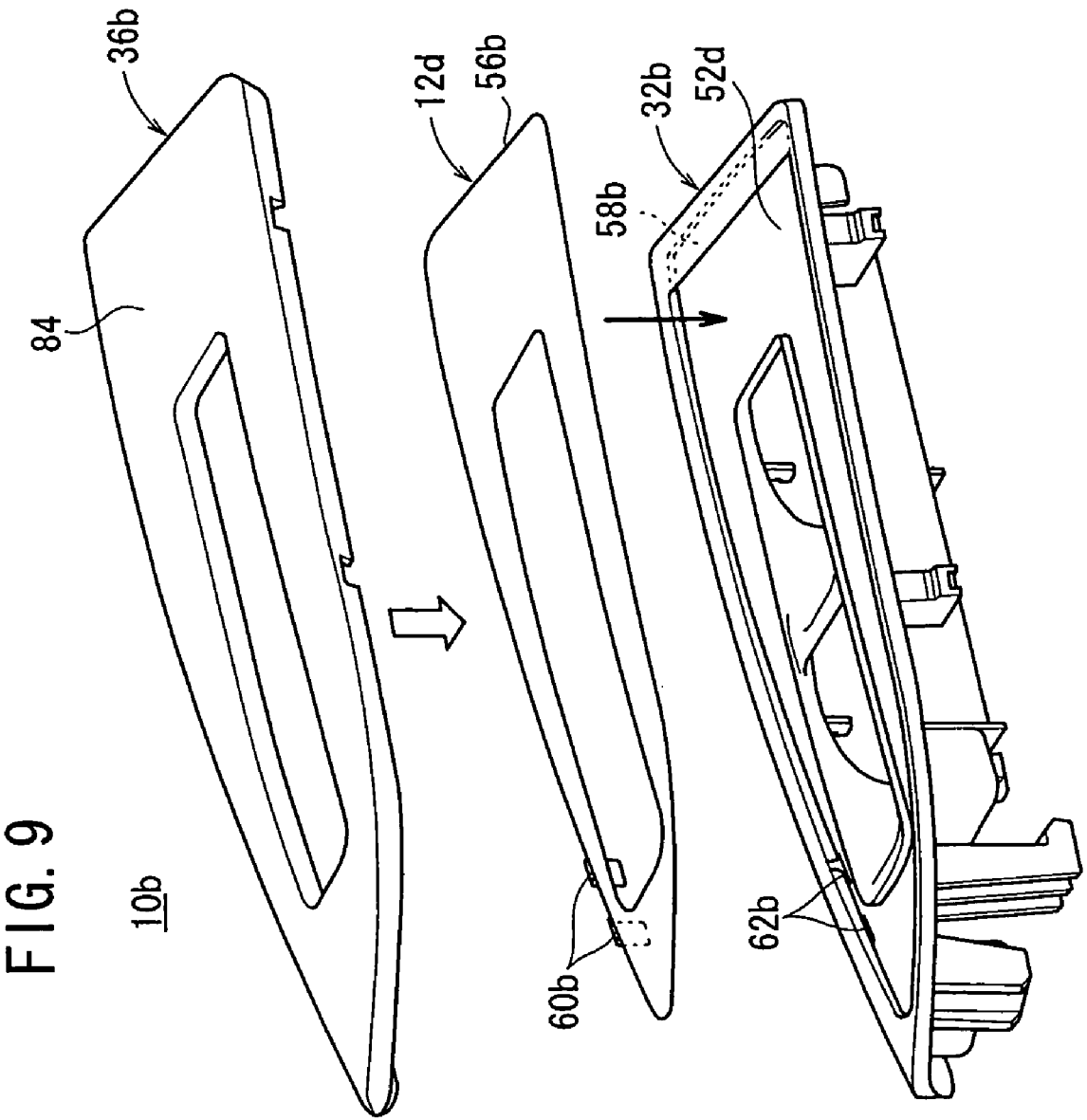
FIG. 9 is an exploded perspective view of a light-emitting device according to the present invention as applied to a garnish of an automobile.

FIG. 9 is an exploded perspective view of a light-emitting device 10*b* according to the present invention as applied to a garnish of an automobile, which is used as an interior or exterior part of the automobile. The light-emitting device 10*b* comprises a fixing body (first molded body) 32*b*, an EL sheet 12*d* held on an outer surface of the fixing body 32*b*, and a molded body (second molded body) 36*b* injection-molded on the outer surface (front surface) of the fixing body 32*b* in covering relation to the EL sheet 12*d*.

The outer surface of the fixing body 32*b* has a positioning recess 52*d* defined therein for placing the EL sheet 12*d* therein. The positioning recess 52*d* includes a groove 58*b* in an end thereof for inserting therein an end 56*b* of the EL sheet 12*d*. The positioning recess 52*d* includes a pair of holes 62*b* in the other end thereof for inserting therethrough respective terminals 60*b* of the EL sheet 12*d*. When the molded body 36*b* is injection-molded around the fixing body 32*b* with the EL sheet 12*d* held thereon, the EL sheet 12*d* and the fixing body 32*b* are assembled in the molded body 36*b* according to insert molding. The molded body 36*b* has an outer surface as a garnish surface 84 placed over the EL sheet 12*d*.

Figure 10:
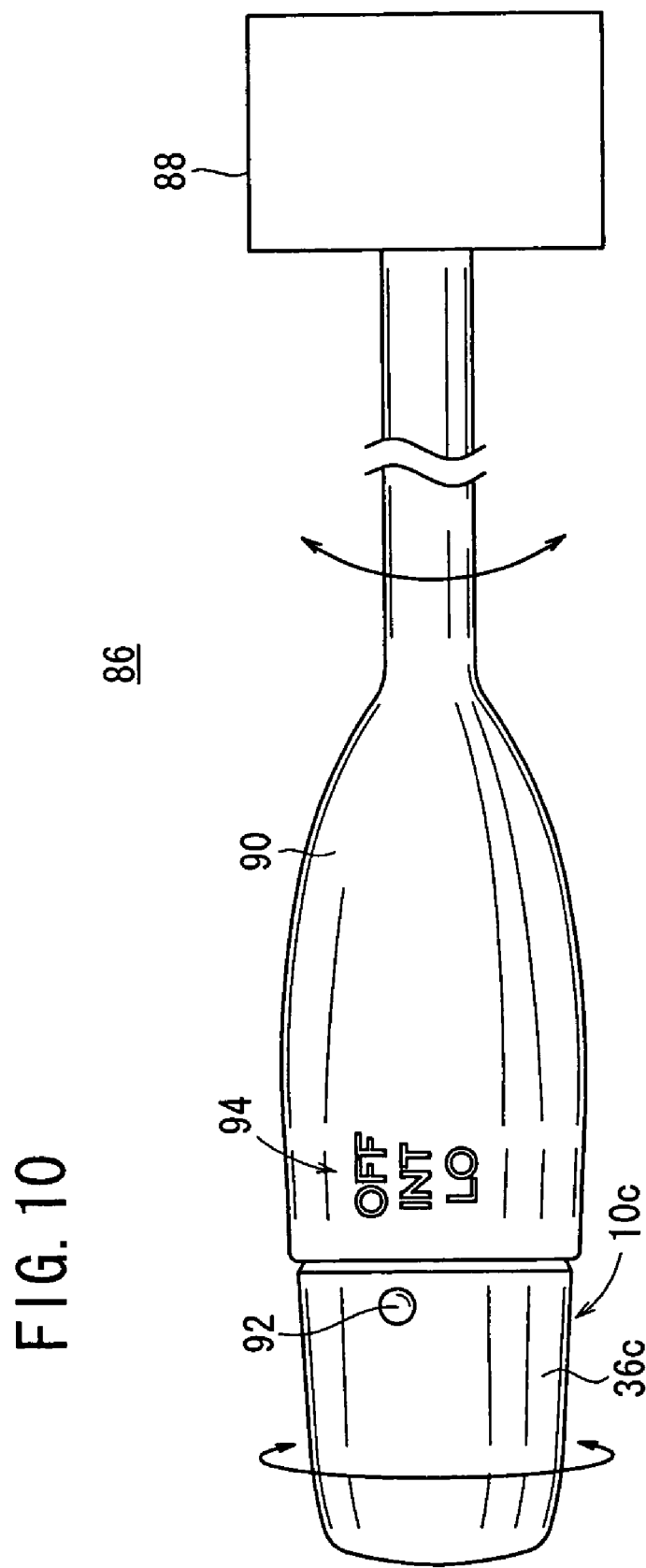
FIG. 10 is a front elevational view of a light-emitting device according to the present invention as applied to a combination switch of an automobile.
Figure 11:
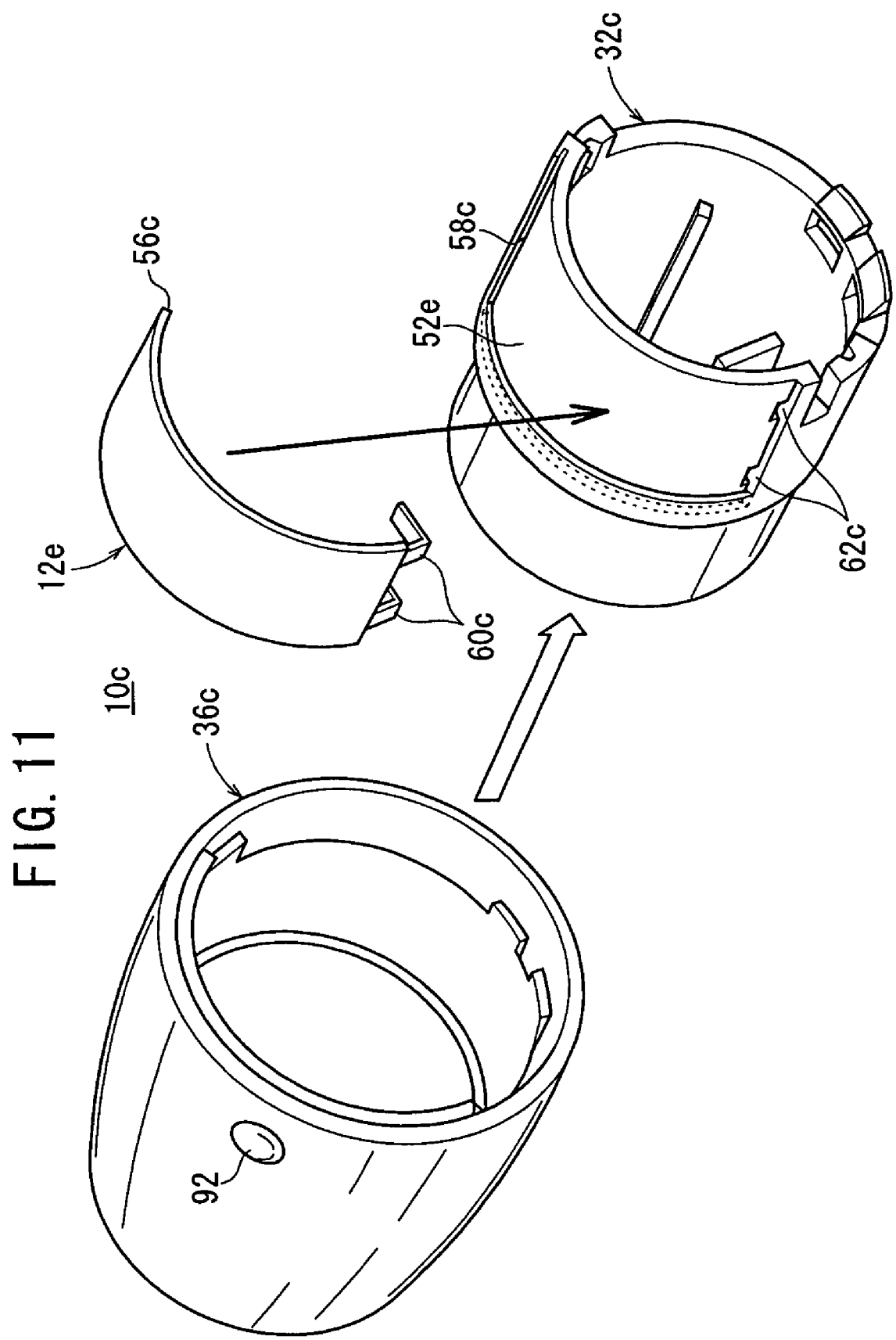
FIG. 11 is an exploded perspective view of the light-emitting device which is incorporated in the combination switch shown in FIG. 10.

FIG. 10 is a front elevational view of a light-emitting device 10*c* according to the present invention as applied to a combination switch 86 of an automobile, and FIG. 11 is an exploded perspective view of the light-emitting device 10*c* which is incorporated in the combination switch 86 shown in FIG. 10.

As shown in FIG. 10, the combination switch 86 includes an operation lever 90 having a proximal end swingably attached to a switch case 88. The light-emitting device 10*c* is mounted on a distal end of the operation lever 90. The light-emitting device 10*c* includes a molded body 36*c* (see FIG. 11) functioning as a rotary knob that is rotatable with respect to the operation lever 90.

The molded body 36*c* has a position indicator 92 on its outer circumferential surface. When the molded body 36*c*, i.e., the rotary knob, is turned, the position indicator 92 is selectively aligned with different positions (OFF, INT, ON) at an indicator mark 94 which indicate different operating states of a windshield wiper, not shown.

As shown in FIG. 11, the light-emitting device 10*c* comprises a fixing body (first molded body) 32*c*, an EL sheet 12*e* held on an outer surface of the fixing body 32*c*, and a molded body (second molded body) 36*c* injection-molded as the rotary knob on the outer surface (front surface) of the fixing body 32*c* in covering relation to the EL sheet 12*e*.

The outer surface of the fixing body 32*c* has a positioning recess 52*e* defined therein for placing the EL sheet 12*e* therein. The positioning recess 52*e* includes a groove 58*c* in an end thereof for inserting therein an end 56*c* of the EL sheet 12*e*. The positioning recess 52*e* includes a pair of holes 62*c* in the other end thereof for inserting therethrough respective terminals 60*c* of the EL sheet 12*c*. When the molded body 36*c* is injection-molded around the fixing body 32*c* with the EL sheet 12*e* held thereon, the EL sheet 12*e* and the fixing body 32*c* are assembled in the molded body 36*c* according to insert molding. The position indicator 92 is placed over the EL sheet 12*e*. In the light-emitting device 10*c*, the molded body 36*c* is angularly movably mounted on the operation lever 90, so that it functions as the rotary knob.

When the EL sheet 12*e* is energized, the position indicator 92 passes therethrough light emitted from the EL sheet 12*e*. The indicator mark 94 on the operation lever 90 may also be arranged to emit light. For the indicator mark 94 to emit light, an EL sheet may be placed in the operation lever 90 beneath the indicator mark 94 by insert molding.

With each of the light-emitting devices 10a through 10c, the EL sheet can easily and reliably be assembled in place according to insert molding, using a fixed mold, a first movable mold, and a second movable mold.

The light-emitting devices according to the present invention may be modified in various ways.

For example, each light-emitting device should preferably have at least two of grooves and holes (e.g., one groove and one hole) as a holder for reliably holding an EL sheet. For example, the light-emitting device may have two grooves and one hole.

Each of the EL sheets incorporated in the light-emitting devices according to the present invention may be of any of various structures other than the structure shown in FIG. 3. Furthermore, each of the light-emitting devices may be molded according to a process other than the process shown in FIGS. 4 and 5.

Although certain preferred embodiments of the present invention have been shown and described in detail, it should be understood that various changes and modifications may be made therein without departing from the scope of the appended claims.

What is claimed is:

1. A light-emitting device comprising:
   an EL sheet assembled according to insert molding;
   a fixing body disposed on one surface of said EL sheet and having a holder for holding said EL sheet prior to being assembled according to insert molding, in a given position; and
   a molded body disposed on another surface of said EL sheet, said molded body being injection-molded in covering relation to said EL sheet held on said fixing body, thereby to integrally combine said fixing body and said EL sheet with said molded body according to insert molding.

2. A light-emitting device according to claim 1, wherein said EL sheet has a feeder terminal, said EL sheet being assembled according to insert molding with only said feeder terminal being exposed from said fixing body or said molded body.

3. A light-emitting device according to claim 2, wherein said fixing body has at least two of said holders, said EL sheet being held by said two holders, one of said holders comprising a groove for inserting therein an end of said EL sheet and the other of said holders comprising a hole for inserting therein said feeder terminal.

4. A light-emitting device according to claim 1, wherein said EL sheet is held in a desired curved shape by said holder.

5. A light-emitting device according to claim 4, wherein said EL sheet is assembled according to insert molding while being elastically deformed and held by said holder.

6. A light-emitting device according to claim 4, wherein said EL sheet has a feeder terminal, said EL sheet being assembled according to insert molding with only said feeder terminal being exposed from said fixing body or said molded body.

7. A light-emitting device according to claim 6, wherein said fixing body has at least two of said holder, said EL sheet being held by said two holders, one of said holders comprising a groove for inserting therein an end of said EL sheet and the other of said holders comprising a hole for inserting therein said feeder terminal.

8. A light-emitting device according to claim 1, which is combined with a light-emitting region of a handle switch of a motorcycle.

9. A light-emitting device according to claim 1, which is combined with a light-emitting region of a power window switch of an automobile.

10. A light-emitting device according to claim 1, which is combined with a light-emitting region of a garnish of an automobile.

11. A light-emitting device according to claim 1, which is combined with a light-emitting region of a combination switch of an automobile.

* * * * *